US005575144A

United States Patent [19]

Brough

[11] Patent Number: 5,575,144

[45] Date of Patent: Nov. 19, 1996

[54] SYSTEM AND METHOD FOR ACTIVELY CONTROLLING PRESSURE PULSES IN A GAS TURBINE ENGINE COMBUSTOR

[75] Inventor: Anthony D. Brough, Hamilton, Ohio

[73] Assignee: General Electric Company, Cincinnati, Ohio

[21] Appl. No.: 345,081

[22] Filed: Nov. 28, 1994

[51] Int. Cl.[6] .......... F02C 7/00

[52] U.S. Cl. .......... 60/39.02; 60/725; 431/114

[58] Field of Search .......... 60/39.02, 725; 181/213, 229; 415/119; 431/114

[56] References Cited

U.S. PATENT DOCUMENTS

| | | | |
|---|---|---|---|
| 3,936,606 | 2/1976 | Wanke | 179/1 P |
| 4,199,295 | 4/1980 | Raffy et al. | 415/115 |
| 4,199,936 | 4/1980 | Cowan et al. | 60/226 R |
| 4,419,045 | 12/1983 | Andre et al. | 415/119 |
| 4,557,106 | 12/1985 | Williams et al. | 60/725 |
| 5,141,391 | 8/1992 | Acton et al. | 415/119 |
| 5,145,355 | 9/1992 | Poinsot et al. | 431/114 |
| 5,197,280 | 3/1993 | Carpenter et al. | 60/204 |
| 5,347,586 | 9/1994 | Hill et al. | 381/71 |
| 5,386,689 | 2/1995 | Bozich et al. | 60/39.33 |

OTHER PUBLICATIONS

Paul K. Houpt and George C. Goodman, "Active Feedback Stabilization of Combustion for Gas Turbine Engines", presented at the 1991 American Control Conference, Boston, MA, Jun. 1991.

*Primary Examiner*—Louis J. Casaregola
*Attorney, Agent, or Firm*—Andrew C. Hess; Nathan D. Herkamp

[57] ABSTRACT

A system for actively controlling pressure pulses in a gas turbine engine combustor is provided, wherein the system includes a means for sensing pressure pulses in the combustor, a first processing means for determining the amplitude and frequency for a predominant pressure pulse of the sensed pressure pulses, a second processing means for calculating an amplitude, a frequency, and a phase angle shift for a cancellation pulse to offset the predominant pressure pulse, and an air bleed means for periodically extracting metered volumes of air from the combustor to produce the cancellation pulse, the air bleed means being controlled by the second processing means. The air bleed means includes a bleed manifold in flow communication with the combustor, a first valve in flow communication with the bleed manifold for controlling the amplitude of the cancellation pulse, and a second valve in intermittent flow communication with the first valve to control the frequency and phase angle shift of the cancellation pulse.

16 Claims, 3 Drawing Sheets

SYSTEM AND METHOD FOR ACTIVELY CONTROLLING PRESSURE PULSES IN A GAS TURBINE ENGINE COMBUSTOR

BACKGROUND OF THE INVENTION

1. Field of the Invention

The present invention relates to the combustor of a gas turbine engine, and, more particularly, to a system for actively controlling pressure pulses in a gas turbine engine combustor in which a cancellation pulse is produced by periodically extracting air from the combustor to offset a predominant pressure pulse.

2. Description of Related Art

It is well known in the art for pressure pulses to be generated in combustors of gas turbine engines as a consequence of normal functioning, such pressure pulses being dependent on fuel-air stoichiometry, total mass flow, and other factors. Pressure pulses can have adverse effects on an engine, including mechanical and thermal fatigue to combustor hardware. The problem of pressure pulses has been found to be of even greater concern in low emissions combustors since a much higher content of air is introduced to the fuel-air mixers in such designs.

Several attempts have been made to eliminate, prevent, or diminish the acoustic pressures produced by such pressure pulses in gas turbine engine combustors. One method has been to elevate flame temperatures, which has achieved moderate success. However, elevating flame temperature is clearly contrary to the goals of low emissions in modern combustors since a relatively low temperature band is preferred. Moreover, it has been found that elevating the flame temperature in a combustor has an undesirable effect on the liners thereof.

Another proposed system has been to utilize an asymmetric compressor discharge pressure bleed. In this system, it is believed that pressure pulses in the combustor take the form of a circumferential pulse located adjacent to the combustion chamber. However, it has been found that pressure pulses within the combustor travel not only in a circumferential manner, but also in an axial manner. More specifically, pulses originating in the combustion chamber travel therein and then are reflected back through the fuel-air mixers into the cold section of the combustor. Therefore, the asymmetric compressor discharge pressure bleed has been found to be unsuccessful in effectively combating pressure pulses in the combustor.

Still another method of counteracting pressure pulses within a gas turbine engine combustor has been the use of detuning tubes positioned at the upstream side of the combustor. These detuning tubes extend into the combustor by a predetermined amount and are effective at balancing out pressure pulses having a fixed amplitude and frequency. Nevertheless, it has been found that pressure pulses within a combustor are variable with changing amplitudes and frequencies. Thus, the aforementioned detuning tubes have met with only a moderate degree of success.

Therefore, it would be desirable for an active system to be developed that effectively offsets the dynamic pressure pulses in a gas turbine engine combustor and not only is able to adapt to pressure pulses of varying amplitude and frequency, but also does not have any adverse effect on the emissions of the combustor.

SUMMARY OF THE INVENTION

In accordance with one aspect of the present invention, a system for actively controlling pressure pulses in a gas turbine engine combustor is provided, wherein the system includes a means for sensing pressure pulses in the combustor, a first processing means for determining the amplitude and frequency for a predominant pressure pulse of the sensed pressure pulses, a second processing means for calculating an amplitude, a frequency, and a phase angle shift for a cancellation pulse to offset the predominant pressure pulse, and an air bleed means for periodically extracting metered volumes of air from the combustor to produce the cancellation pulse, the air bleed means being controlled by the second processing means. The air bleed means includes a bleed manifold in flow communication with the combustor, a first valve in flow communication with the bleed manifold for controlling the amplitude of the cancellation pulse, and a second valve in intermittent flow communication with the first valve to control the frequency and phase angle shift of the cancellation pulse.

In another aspect of the present invention, a method of actively controlling pressure pulses in a gas turbine engine combustor is described, wherein the method includes the steps of sensing pressure pulses in the combustor, determining an amplitude and a frequency for a predominant pressure pulse of the sensed pressure pulses, calculating an amplitude, a frequency, and a phase angle shift for a cancellation pulse to offset the predominant pressure pulse, and periodically extracting metered volumes of air from the combustor to produce the cancellation pulse. This method also involves the steps of variably positioning a first valve to control the amplitude of the cancellation pulse and controlling the intervals in which a second valve is in and out of flow communication with the first valve to control the frequency and phase shift angle of the cancellation pulse.

BRIEF DESCRIPTION OF THE DRAWING

While the specification concludes with claims particularly pointing out and distinctly claiming the present invention, it is believed that the same will be better understood from the following description taken in conjunction with the accompanying drawing in which:

DETAILED DESCRIPTION OF THE INVENTION

Figure 1:
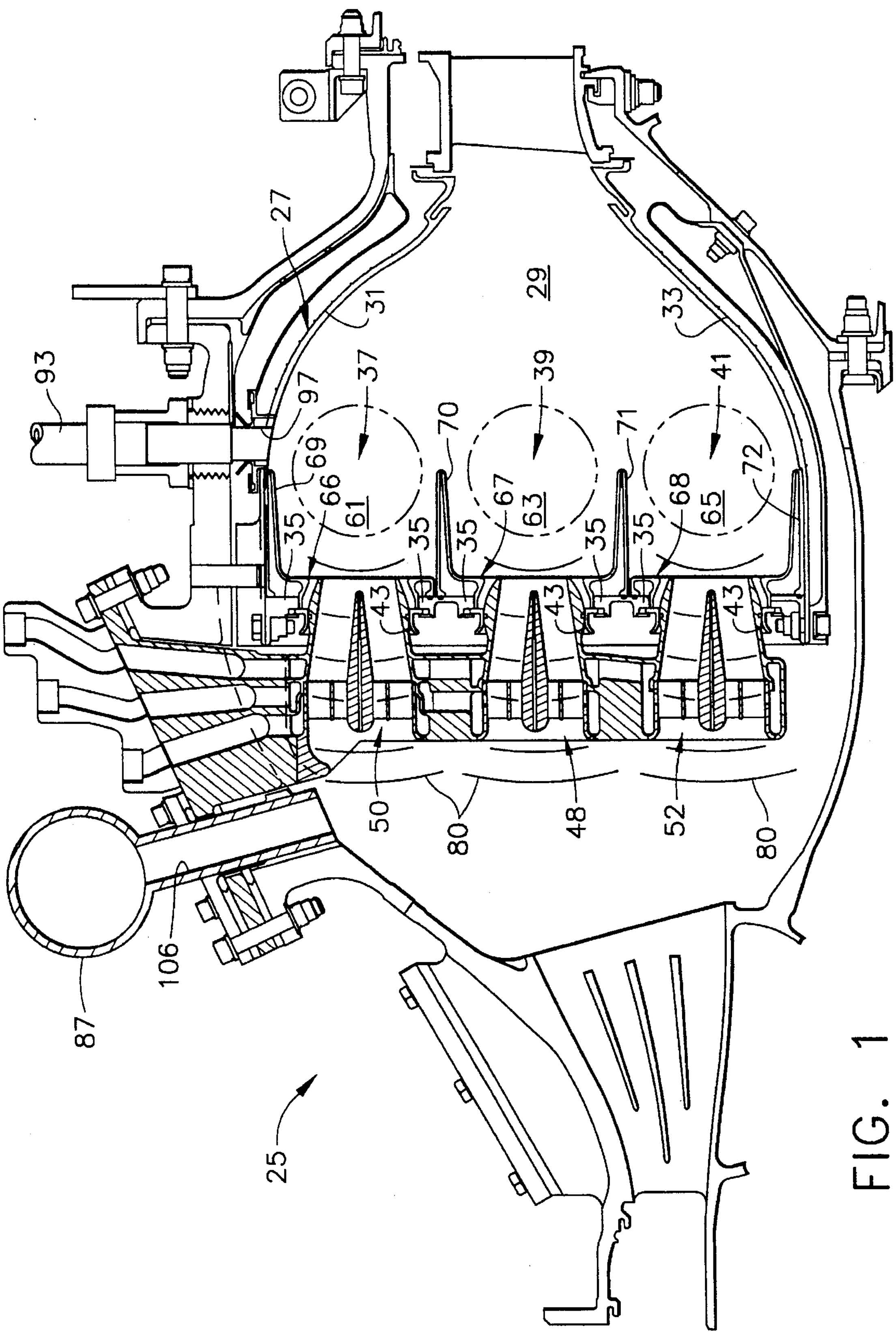
FIG. 1 is a longitudinal cross-sectional view through a combustor structure including the system of the present invention.

Referring now to the drawing in detail, wherein identical numerals indicate the same elements throughout the figures, FIG. 1 depicts a combustion apparatus 25 of the type suitable for use in a gas turbine engine. Combustor 25 is a triple annular combustor designed to produce low emissions as described in more detail in U.S. Pat. No. 5,323,604, also owned by the assignee of the present invention and hereby incorporated by reference. It will be noted that combustor 25 has a hollow body 27 defining a combustion chamber 29 therein. Hollow body 27 is generally annular in form and is comprised of an outer liner 31, an inner liner 33, and a domed end or dome 35. It should be understood, however, that the present invention is not limited to such an annular configuration and may well be employed with equal effectiveness in a combustion apparatus of the well known cylindrical can or cannular type. Moreover, while the present invention is shown as being utilized in a triple annular combustor, it may also be utilized in a single or double annular design.

More specifically, as described in U.S. Pat. No. 5,323,604, triple annular combustor 25 includes an outer dome 37, a middle dome 39, and an inner dome 41. Fuel/air mixers 48, 50 and 52 are provided in openings 43 of middle dome 39, outer dome 37 and inner dome 41, respectively. Heat shields 66, 67 and 68 are also provided to segregate the individual primary combustor zones 61, 63 and 65, respectively. It will be seen that heat shield 66 includes an annular centerbody 69 to help insulate outer liner 31 from flames burning in primary zone 61. Heat shield 67 has annular centerbodies 70 and 71 to segregate primary zone 63 from primary zones 61 and 65, respectively. Heat shield 68 has an annular centerbody 72 in order to insulate inner liner 33 from flames burning in primary zone 65.

It will be understood that pressure pulses associated with the operation of combustor 25 impose excessive mechanical stress on the gas turbine engine. For example, pressure pulses identified by the numeral 80 originate in combustion chamber 29 and are reflected back through mixers 48, 50 and 52. This has had the undesirable effect of cracking heat shields 66, 67 and 68.

Figure 3:
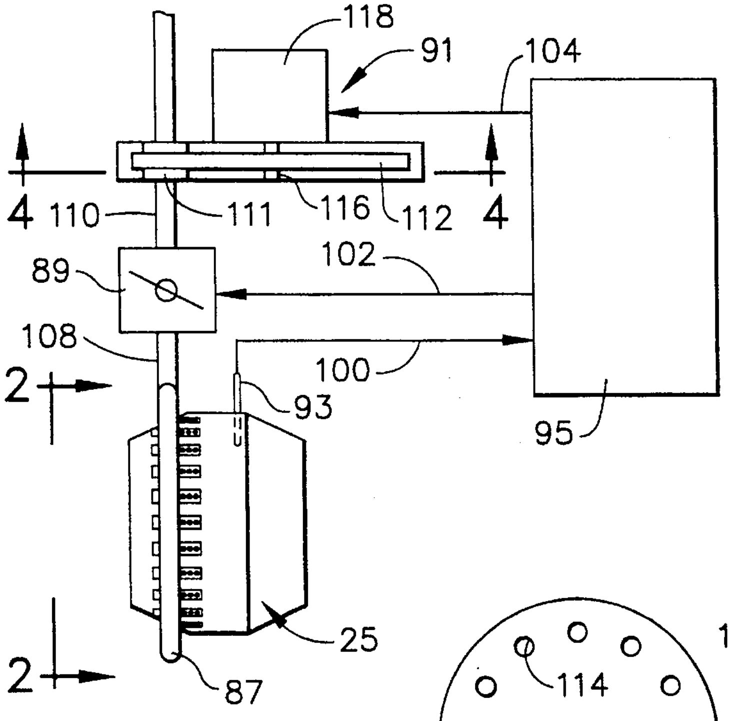
FIG. 3 is a diagrammatic side view of the system of the present invention.

In order to offset or compensate for pressure pulses 80 within combustor 25, a system denoted generally by the numeral 85 has been developed (see FIG. 3). System 85 principally involves the extraction of air from combustor 25 in metered amounts which is vented to atmosphere. It will be understood that system 85 is an electro-mechanical system, where the mechanical aspect thereof involves a combustor bleed manifold 87 in flow communication with combustor 25, a combustor bleed valve 89 in flow communication with combustor bleed manifold 87, and a combustor rotating valve 91 which is in intermittent flow communication with combustor bleed valve 89. The electrical aspect of system 85 involves the use of a pressure sensor or transducer 93 to sense pressure pulses 80 within combustor 25 and a control unit 95 which determines a predominant pressure pulse from pressure pulses 80 within combustor 25, calculates a cancellation pulse for offsetting the predominant pressure pulse, and controls combustor bleed valve 89 and combustor rotating valve 91 in such manner as to properly extract air from combustor 25 and produce the desired cancellation pulse.

Figure 5:
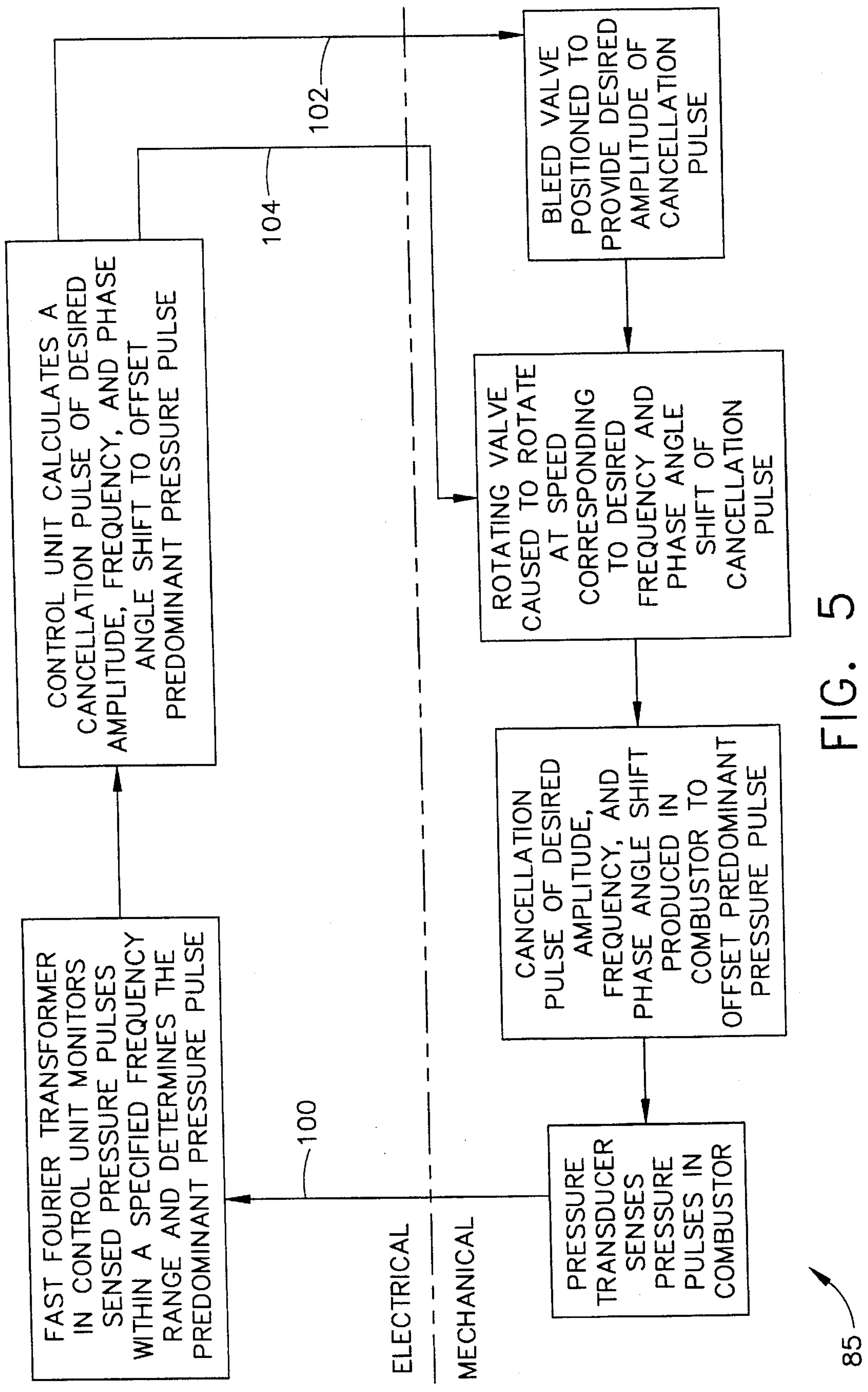
FIG. 5 is a block diagram of the system of the present invention.

More specifically, as denoted in the block diagram of FIG. 5, system 85 first senses pressure pulses 80 in combustion chamber 29. Although other pressure sensing devices may be utilized, pressure transducer 93 preferably is a piezoelectric pressure transducer such as the dynamic pressure sensing system available from Vibrometer of Fribourg, Switzerland. It will be seen in FIG. 2 that pressure transducers 93 are preferably positioned within borescope holes 97 and 99 located along the circumference of combustor 25. Although the intention is to utilize the pre-existing borescope holes 97 and 99, it will be understood that pressure transducers 93 are preferably spaced nearly 180° apart so that pressure pulses 80 may be measured along each side of combustor 25. Signals 100 from pressure transducer 93 indicating the amplitude and respective frequency of pressure pulses 80 are then sent to control unit 95.

Control unit 95 includes therein a Fast Fourier transformer which preferably scans a predetermined frequency band of interest from signals 100 sent by pressure transducer 93 and then determines the amplitude and frequency of a predominant pressure pulse. It has been found that pressure pulses having a frequency within a range of 100–700 Hertz are a known problem area for combustor 25, but this range may change depending on the design of the combustor. The predominant pressure pulse is defined herein as the pressure pulse having the greatest amplitude, although control unit 95 can be programmed to account for other factors in determining the predominant pressure pulse.

Control unit 95 then takes the amplitude and associated frequency of the predominant pressure pulse and calculates a cancellation pulse to offset it. The cancellation pulse will typically have an amplitude and frequency substantially similar to that of the predominant pressure pulse; however, it will be understood that a phase angle shift for the cancellation pulse is also calculated so that the cancellation pulse is substantially 180° out of phase with the predominant pressure pulse. Providing a cancellation pulse which offsets only the predominant pressure pulse in combustor 25 has been found to have an effect on other pressure pulses therein and bring the overall amplitude of pressure pulses 80 within an acceptable range (e.g., 2.5 psi delta absolute). Thus, while additional cancellation pulses may be provided for more than one predominant pressure pulse, it has been found to be unnecessary and duplicative.

Once the cancellation pulse has been calculated by control unit 95, it sends a signal 102 to combustor bleed valve 89 in order to control the amplitude of the cancellation pulse. Likewise, control unit 95 sends a signal 104 to combustor rotating valve 91 in order to control the frequency and phase angle shift of the cancellation pulse.

Insofar as the mechanical aspect of system 85 is concerned, combustor bleed manifold 87 is shown as being located upstream of fuel/air mixers 48, 50 and 52 and combustion chamber 29 (see FIG. 1), although combustor bleed manifold 87 could be located downstream of fuel/air mixers 48, 50 and 52 adjacent combustion chamber 29. Combustor bleed manifold 87 is currently positioned at the upstream end of combustor 25 in order to take advantage of existing structure for introducing fuel to combustor 25. Nevertheless, positioning combustor bleed manifold 87 on the hot side of combustor 25 could prove to be more desirable since it likely would better offset pressure pulses 80 originating in combustion chamber 29.

Figure 2:
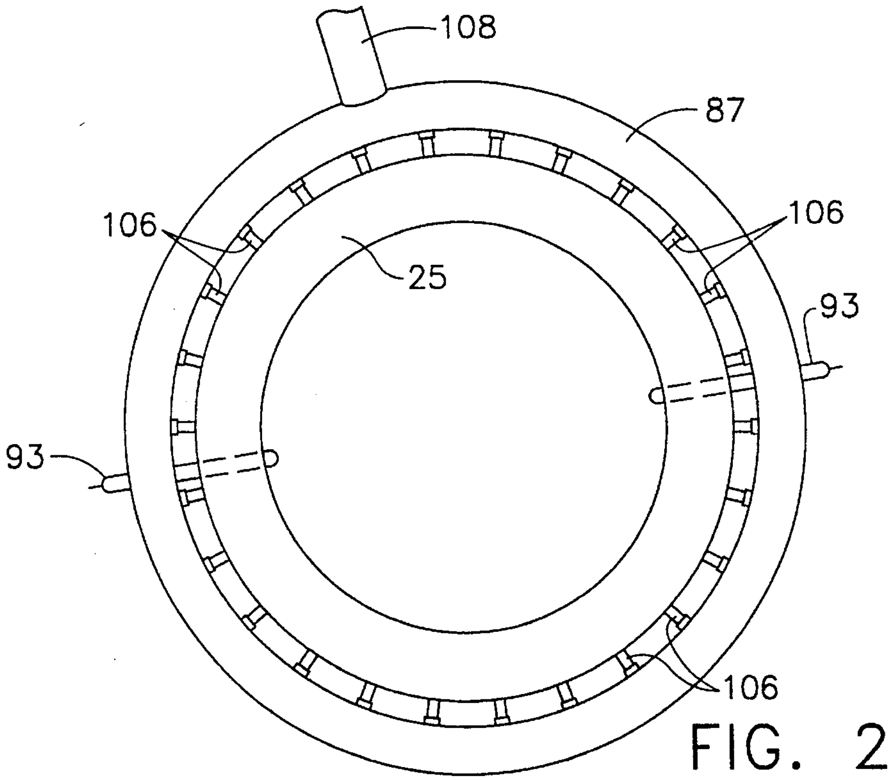
FIG. 2 is a front view of the combustor depicted in FIG. 1.

As seen in FIG. 2, combustor bleed manifold 87 is preferably ring-shaped and includes a plurality of extraction tubes 106 which are connected to combustor bleed manifold 87 at one end and are in flow communication with compressed air entering combustor 25 at the other end. In order to take advantage of existing structure, the number of extraction tubes 106 is preferably related to the number of staging valves utilized for injecting fuel into combustor 25. It will be understood that compressed air having a generally constant pressure (approximately 100–450 psia) will flow into combustor bleed manifold 87 through extraction tubes 106.

Combustor bleed valve 89 is in constant flow communication with combustor bleed manifold 87 by means of an air line 108. As stated previously herein, combustor bleed valve 89 is utilized to control the amount or volume of air extracted from combustor 25 and consequently the amplitude of the cancellation pulse. This is accomplished by variably positioning combustor bleed valve 89, preferably by means of an electrohydraulic servo valve acting as an interface between combustor bleed valve 89 and control unit 95 as known in the gas turbine engine art. Accordingly, signal 102 from control unit 95 is input to the servo valve, whereupon the servo valve causes combustor bleed valve 89 to open or close a specified amount to enable the desired volume of air to be extracted. Either a linear or rotating variable displacement transformer will preferably be utilized in association with combustor bleed valve 89 in order to transmit back to control unit 95 a signal as to the positioning of combustor bleed valve 89. Another portion 110 of air line 108 then extends between combustor bleed valve 89 and combustor rotating valve 91.

Figure 4A:
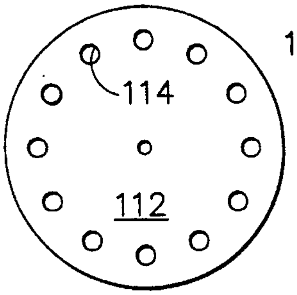
FIG. 4A is a top view of the rotating valve disk depicted in FIG. 3.

The purpose of combustor rotating valve 91 is to control the frequency and phase angle shift of the cancellation pulse. Preferably, combustor rotating valve 91 includes a rotating disk 112 which has a plurality of bleed ports 114 therethrough (see FIG. 4A). It will be understood that bleed ports 114 are preferably sized so as to approximate the size of air line 108. In addition, a seal 111 is provided (see FIG. 3) to prevent air entering combustor rotating valve 91 from spilling out around rotating disk 112 and thus permit the air to flow only through bleed ports 114. Accordingly, as bleed ports 114 align with air line portion 110, the pressurized air transmitted through combustor bleed valve 89 is vented to atmosphere. The nature of combustor rotating valve 91 is that there will be times or intervals when no bleed port 114 aligns with air line portion 110, thereby causing flow communication with combustor bleed valve 89 to be intermittent.

Combustor rotating valve 91 also includes a shaft 116 which is engaged preferably with the middle of rotating disk 112. Shaft 116 is driven by an electric motor 118, which preferably is a stepper motor. Control unit 95, as stated hereinabove, sends a signal 104 to combustor rotating valve 91 and specifically to electric motor 118. Control signal 104 will be in a form causing electric motor 118 to turn rotating disk 112 a specified speed, which translates into a corresponding desired frequency for the cancellation pulse by the following relationship:

$$\text{Speed of rotating disk (rpm)} = \frac{\text{desired frequency of cancellation pulse} \times 60}{\text{number of bleed ports}}$$

It will also be noted that air line 108 continues past combustor rotating valve 91 so the extracted air may be vented to atmosphere anywhere along the engine.

Figure 4B:
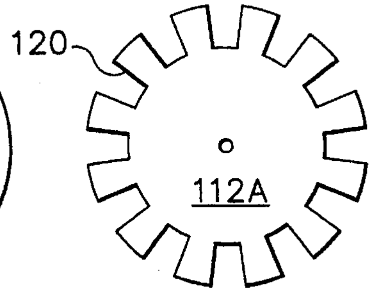
FIG. 4B is a top view of a rotating valve disk like that in FIG. 4A having an alternative embodiment.

It will be understood that rotating disk 112 may have a different configuration so long as it provides intermittent flow communication with air line portion 110. As shown in FIG. 4B, a rotating disk 112A may have notches 120 about the circumference thereof. As with bleed ports 114 of rotating disk 112, notches 120 in rotating disk 112A will intermittently align with air line portion 110 so that air is allowed to periodically flow through combustor rotating valve 91.

It should be noted that pressure pulses 80 within combustor 25 may change due to ambient temperature and air flow changes within combustor 25, as well as transitions involving the lighting of various fuel/air mixers within outer dome 37, middle dome 39, and inner dome 41. Therefore, because pressure pulses 80 are apt to change according to different conditions and factors, system 85 works continuously in a closed loop fashion (see FIG. 5) to update the amplitude and frequency of the predominant pressure pulse. Correspondingly, control unit 95 continuously updates and changes the cancellation pulse as required by changes in the predominant pressure pulse.

Having shown and described the preferred embodiment of the present invention, further adaptations of the system and method for controlling pressure pulses in a gas turbine engine combustor can be accomplished by appropriate modifications by one of ordinary skill in the art without departing from the scope of the invention.

What is claimed is:

1. A system for actively controlling pressure pulses in a combustor of a gas turbine engine, comprising:

(a) means for sensing pressure pulses in said combustor;

(b) a first processing means for determining a predominant pressure pulse of said sensed pressure pulses and an amplitude and frequency of said predominant pressure pulse;

(c) a second processing means for calculating an amplitude, a frequency, and a phase angle shift for a cancellation pulse to offset said predominant pressure pulse; and (d) air bleed means in flow communication with said combustor for periodically extracting metered volumes of air from said combustor to produce said cancellation pulse, said air bleed means being controlled by said second processing means.

2. The system of claim 1, said air bleed means further comprising:

(a) a bleed manifold in flow communication with said combustor;

(b) a first valve in flow communication with said bleed manifold; and (c) a second valve in intermittent flow communication with said first valve.

3. The system of claim 2, wherein said bleed manifold is located upstream of a combustion chamber in said combustor.

4. The system of claim 2, wherein said bleed manifold is located adjacent a combustion chamber in said combustor.

5. The system of claim 2, wherein said first valve may be variably positioned to regulate the volume of air extracted through said bleed manifold, whereby the amplitude of said cancellation pulse is controlled.

6. The system of claim 2, wherein said second valve may be in flow communication with said first valve at varying intervals to regulate the frequency of air extracted through said first valve, whereby the frequency and phase angle shift of said cancellation pulse is controlled.

7. The system of claim 1, wherein said first processing means monitors said pressure pulses within a frequency range of 100–700 Hertz.

8. The system of claim 1, wherein the amplitude and frequency of said predominant pressure pulse and said cancellation pulse is variable.

9. The system of claim 1, said pressure sensing means comprising at least one pressure transducer located adjacent a combustion chamber of said combustor.

10. The system of claim 1, wherein said predominant pressure pulse is continuously determined and said cancellation pulse is continuously calculated and produced in a closed loop circuit.

11. The system of claim 2, said second valve further comprising:

(a) a disk having a plurality of circumferentially spaced bleed ports, wherein said bleed ports are brought into and out of flow communication with said first valve as said disk is rotated; and (b) means for rotating said disk at varying speeds in response to control signals from said second processing means.

12. A method of actively controlling pressure pulses in a combustor of a gas turbine engine, comprising the following steps:

(a) sensing pressure pulses in said combustor;

(b) determining an amplitude and a frequency for a predominant pressure pulse of said sensed pressure pulses;

(c) calculating an amplitude, a frequency, and a phase angle shift for a cancellation pulse to offset said predominant pressure pulse; and (d) periodically extracting metered volumes of air from said combustor to produce said cancellation pulse.

13. The method of claim 12, further comprising the step of variably positioning a first valve to control the amplitude of said cancellation pulse.

14. The method of claim 13, further comprising the step of rotating a second valve into and out of flow communication with said first valve at varying intervals to control the frequency and phase shift angle of said cancellation pulse.

15. The method of claim 12, further comprising the step of monitoring said sensed pressure pulses within a specified frequency range.

16. The method of claim 12, wherein said steps are performed continuously in a closed loop mode.

* * * * *